Oct. 17, 1950
L. W. MURPHY
2,526,037
PROCESS FOR IMMOBILIZING LIVESTOCK
PRIOR TO SLAUGHTERING
Filed Dec. 17, 1948
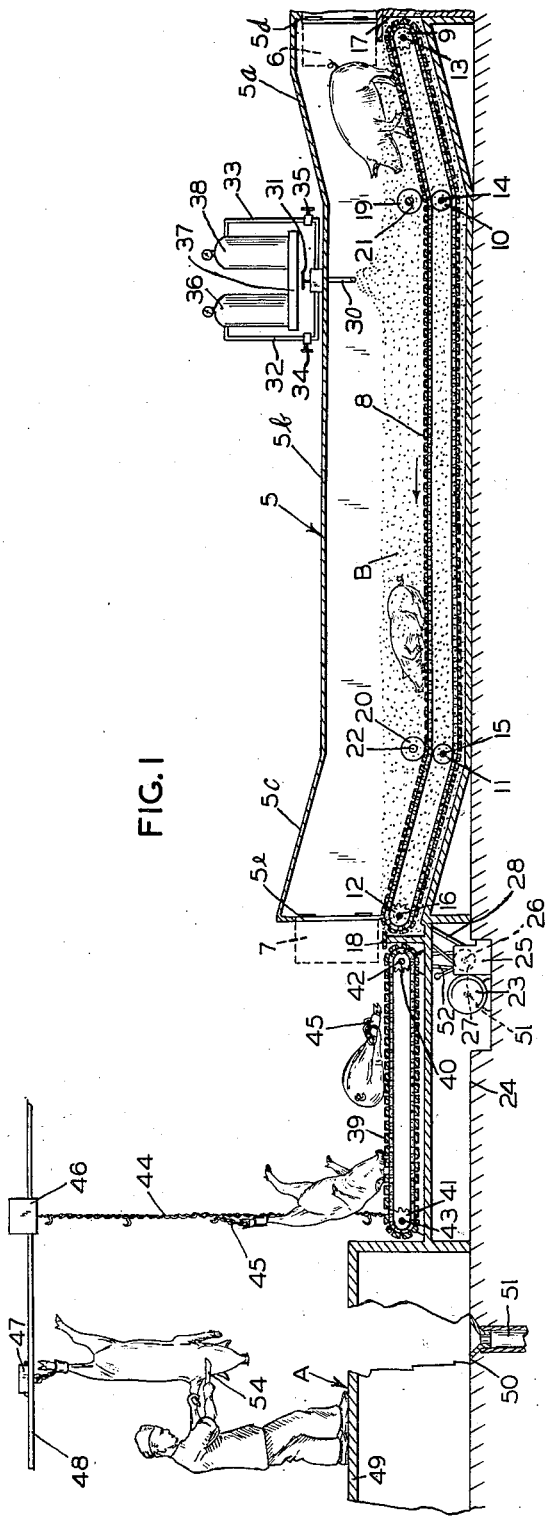
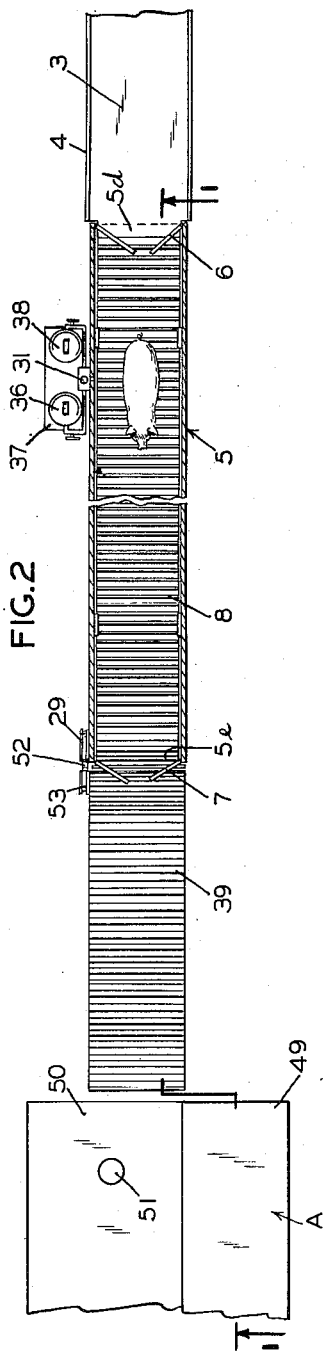
INVENTOR
LAURENCE W. MURPHY
BY *Williamson & Williamson*
ATTORNEYS Patented Oct. 17, 1950

2,526,037

UNITED STATES PATENT OFFICE 2,526,037

PROCESS FOR IMMOBILIZING LIVESTOCK PRIOR TO SLAUGHTERING

Laurence W. Murphy, Austin, Minn., assignor to Geo. A. Hormel & Company, Austin, Minn., a corporation of Delaware Application December 17, 1948, Serial No. 65,931

7 Claims. (Cl. 17—45)

This invention relates to processes for slaughtering animals and particularly to processes and apparatus for immobilizing animals prior to slaughtering.

As hogs are slaughtered in accepted practice today in a slaughter house, the hogs are driven in groups of ten to thirty through a gate into a pen or pens located at the top floor of a slaughter house slightly below the level of and adjacent to conveyors which carry the hogs to what is commonly referred to as the "sticker station." After a group of hogs have been driven into one of the pens two or more men working in each pen successively shackle the hogs in the pen, one at a time. In shackling a hog, the hog is caught by one of its rear legs and a shackling chain is engaged around the caught leg, whereupon the other end of the chain is connected to an elevating conveyor which carries the shackling chain and the hog upwardly off the floor to suspend the hog head downward, and the shackled hog is then transferred to an overhead horizontal conveyor. The hog suspended from the overhead horizontal conveyor is carried along beside a platform to the "sticker station."

At the sticker station, the sticker sticks the hog at the throat with a knife cutting the carotid artery of the hog while the hog is still alive, and the heart of the hog, after the carotid artery is cut, continues to pump the blood, causing most of the blood to be pumped and drained from the hog's body. After the hog is stuck and blood has been drained from the carcass, it is advanced by the horizontal conveyor to a point over a tank of scalding water into which the hog is dropped; the scalding water acting to loosen the hair and bristles from the hog's skin. The shackling of the live hogs in the pens into which a group of hogs has been driven is a dirty, rough, tough, dangerous and disagreeable task, and it is customary in most slaughter houses to employ two crews for this purpose who, because of the arduous physical requirements of the task, alternate at half hour intervals. The din from the hogs' squealing adjacent to the shackling pens is terrific, and the hogs when suspended head down in live condition by one leg prior to the sticking operation are frightened and tend to tighten all their muscles. If the hogs' muscles are tightened when the hogs are stuck, the hogs will not bleed as freely when stuck as would otherwise be the case if the hogs were muscularly relaxed when stuck. Also, as the hogs are stuck they struggle a good deal, throwing blood in all directions and throwing more or less blood over the shoulders, sides, backs, and bellies of their own bodies as well as on other shackled hogs. The blood is valuable to the packer for commercial use, and, of course, the scalding water into which the hog is placed after sticking must be replaced frequently, the frequency of replacement depending, to a large extent, on the amount of blood that is carried by the hog into the water. It is highly important, in order to get the best hams and other cuts from the hog, that as much blood as possible be drained from the hog's body as the sticking occurs and as a result of the sticking.

It is among the objects of the present invention to provide a slaughtering process particularly adapted for use in the slaughtering of hogs, but capable of use in connection with the slaughtering of other animals; which process will eliminate the necessity for shackling the animals to be slaughtered while they are still in control of their voluntary movements; which process will prevent the animals from tightening or contracting their muscles as they are stuck and permit the more free bleeding of the animals and the drainage of greater quantities of blood from the bodies of the animals; which process will prevent the struggling of the animals after they are stuck and eliminate to a large extent the smearing and spreading of blood from the animals over their bodies and the bodies of adjacent animals; thereby occasioning less frequent changes of the scalding water into which the carcasses are placed, while conserving the blood from the animals for utilization; which process will eliminate much of the din occasioned by the slaughtering of the animals, and which process will do the work in a much more humane manner than heretofore.

It is another object to provide a process of slaughtering animals which includes the steps of moving the animals in a continuous stream through a gas chamber, subjecting them to an anaesthetizing gas in the chamber for a period sufficient to immobilize the voluntary processes of the animals without affecting the involuntary processes of the animals and sticking the animals to bleed them after they emerge from the gas chamber and while the voluntary processes of the animals are immobilized and while the involuntary processes of the animals are still active.

Another object is to provide a process of slaughtering animals which consists in moving the animals in a continuous stream through a tunnel having an intermediate portion at a lower level than the entrance and exit ends and subjecting the animals while in the gas chamber to the effects of an anaesthetizing gas such as carbon dioxide, carbon monoxide, or nitrous oxide and heavier than air to immobilize the voluntary processes of the animals without affecting the involuntary processes of the animals as they are shackled and stuck and bled after the animals emerge from the tunnel.

Another object is to provide a novel and improved apparatus for use in immobilizing the voluntary processes of the animals without affecting their involuntary processes prior to slaughter.

The objects and advantages of the invention will more fully appear from the following description made in conjunction with the accompanying drawings, wherein there is disclosed in somewhat diagrammatical manner apparatus embodying the invention and employed for carrying out the processes of the invention; and in which Fig. 1 is a view principally in vertical section through the apparatus taken substantially on the line 1—1 of Fig. 2, and Fig. 2 is a plan view looking down on the apparatus, the tunnel being shown in horizontal section.

The apparatus will be first described, whereupon the processes will be described in connection with the apparatus illustrated.

The apparatus includes a platform 3 enclosed by upstanding side walls 4 and over which platform the animals such as hogs to be slaughtered will be driven in line, the space between the side walls 4 being such as to prevent the hogs from turning. In other words, the spacing between the two side walls 4 is slightly greater than the width of the hog's body but less than the length of the hog, so that the hog cannot turn around as it travels over the platform 3. Adjoining the platform 3 is a long tunnel 5. This tunnel includes a downwardly inclined entrance leg 5a, a horizontally disposed intermediate or central section 5b of considerable length joining the entrance leg and an upwardly inclined exit leg 5c joining the central section 5b. The entrance leg 5a has an entrance opening 5d to receive from the platform 3, and this entrance opening is normally closed by a pair of inwardly swinging doors 6 hinged to the entrance leg. The exit leg 5c has an exit outlet 5e which is normally closed by a pair of outwardly swinging doors 7 hinged to the exit leg 5c. Within the lower portion of the tunnel 5 there is located a conveyor 8 which may be of the slat and chain type as illustrated, the chains of this conveyor running over a series of sprockets 9, 10, 11, and 12 carried by cross shafts 13, 14, 15, and 16, respectively, journalled in the side walls of the tunnel 5. The conveyor works in the lower portion of the tunnel 5, the upper run of the conveyor being inclined diagonally downwardly from the entrance opening 5d, then extending horizontally through the lower portion of the central section 5b of the tunnel below the level of the entrance and exit openings 5d and 5e and then inclining diagonally upwardly to the exit opening 5e. The ends of the tunnel below the entrance and exit openings 5d and 5e are closed by partitions 17 and 18 as illustrated for a purpose presently to appear. Idler wheels 19 and 20 journalled on shafts 21 and 22, respectively, overlie the upper run of the conveyor 8 immediately above the sprockets 10 and 15, respectively, thereby causing the conveyor to take the configuration shown in the drawings.

While any suitable variable speed driving mechanism may be employed for driving the conveyor 8 so that the upper run thereof will move from the entrance end 5d of the tunnel toward the exit end 5e, there is illustrated for this purpose in the drawings an electric motor 23 mounted on the floor 24 of the slaughter house, and this motor may be employed for driving through a suitable variable speed transmission 25 a shaft 26 carrying a pulley 27 over which a belt 28 runs, this belt in turn passing over a pulley 29 carried by the shaft 16. By shifting the variable speed transmission mechanism 25 it will be possible to drive the shaft 16 at different speeds to vary the speed of the movement of the conveyor 8.

Located in the tunnel 5, preferably near the entrance leg 5a of the same, is a supply pipe 30 for supplying an anaesthetizing gas to the interior of the tunnel 5. This pipe in turn will preferably be controlled by control valve 31 to which access may be had from the exterior of the tunnel 5, and the valve 31 will preferably have two inlet branches, one of which is connected to a branch line 32 and the other of which is connected to a branch line 33. The line 32 is equipped with a regulating valve 34, while the line 33 is equipped with a regulating valve 35. The line 32 runs to a tank 36 which contains an anaesthetizing gas heavier than air. The anaesthetizing gas that I prefer to use is carbon dioxide, although it is possible that other gases may be employed, and I contemplate the possibility of using such gases as carbon monoxide or nitrous oxide (laughing gas) for my purposes. The tank 36 carrying the anaesthetizing gas under pressure will normally be equipped with a pressure gauge as illustrated and may be mounted as on a bracket 37. The line 33 is connected to a tank 38 which may be also conveniently mounted on the bracket 37 and which will preferably contain either oxygen or air in a compressed condition. By regulating the two valves 34 and 35 a proper mixture of the anaesthetizing gas with oxygen or air can be obtained and, of course, the valve 31 will be employed for regulating the supply of the gas to the tunnel 5.

The conveyor 8 which works within the tunnel discharges on to another conveyor 39 preferably of the slat and chain type which may be horizontally disposed as is indicated, the chains of which run over sprockets 40 and 41, respectively, carried by suitably journalled shafts 42 and 43, respectively. Mounted at one side of the conveyor 39, as more or less diagrammatically illustrated in the drawings, is a vertical conveyor 44 carrying hooks to receive the eyes of shackling chains 45 which are employed for shackling the legs of the hogs. The vertical conveyor 44 runs upwardly to a transfer mechanism 46 of standard construction, the details of which are not illustrated and which will cause disengagement of the shackling chains 45 from the conveyor 44 and engagement of these shackling chains with overhead conveyors 47 mounted on overhead tracks 48. The tracks 48 run to points adjacent and alongside what is known as the sticker station A in the slaughter house at which point men equipped with knives may stand on a platform 49 at one side of a trough 50 equipped with a drain 50a and over which the carcasses travel.

To drive the conveyor 39 any suitable driving means may be employed such as a belt 52 working over a pulley (not shown) carried by the transmission shaft 26, the belt also extending over a pulley 53 carried by the shaft 40.

In using the apparatus to carry out the process of the invention in slaughtering such animals as hogs, anaesthetizing gas such as carbon dioxide will be supplied as from the tank 36 through pipe 30 to the interior of the tunnel 5 so as to fill the lower portion of the tunnel below the level of the inlet and exit openings 5d and 5e and to a level approximating the level indicated in Fig. 1, the gas being designated by the letter B. The concentration of the anaesthetizing gas may be varied in the tunnel 5 by adding more or less oxygen or air from the tank 38 through operation of the control valve 35. The motor 23 will be set into operation, and through operation of the variable speed transmission 25 the conveyors 8 and 39 will be driven at a controlled speed so that a desired time interval will elapse for a particular portion of the upper run of the conveyor 8 to traverse the tunnel, the upper runs of these conveyors moving from right to left as shown in the drawings. The hogs to be slaughtered will be driven in a continuous line along the platform 3, being confined by the walls 4 to prevent them from turning as they are driven forwardly. As a hog approaches the entrance opening 5d to the tunnel it will force the entrance doors 6 inwardly and the hog will move through the entrance opening 5d, to be thereafter carried forwardly by the upper run of the conveyor 8. The side walls of the tunnel 5 are spaced a distance slightly greater than the width of the hog and less distance apart than the length of the hog so it will be impossible for the hog to turn in the tunnel 5 as it is being conveyed forwardly by the conveyor. The anaesthetizing gas B, being heavier than air, will lie in a belt below the level of the lower edges of the doors 6 and 7 in the tunnel without escaping, and as the hog is advanced by the upper run of the conveyor it will be carried diagonally downwardly into the intermediate section 5b of the tunnel where it will be then moved horizontally below the level of the anaesthetizing gas to be subjected to the anaesthetizing gas. This gas is supplied in such proper concentration relative to the speed of the upper run of the conveyor 8 that the hog during its travel through the tunnel will be anaesthetized to fall on to the upper run of the conveyor and the anaesthesia will be sufficient to immobilize the voluntary processes of the hog without killing the hog and without affecting the involuntary processes of the animal. The anaesthesia will also be sufficient so that the hog will remain under the anaesthesia until the hog passes the sticking station A. After the hog has been treated with the gas in the central section of the tunnel 5 it will be raised and carried out of the tunnel through exit opening 5e, the exit doors 7 swinging outwardly to permit the hog to be carried through this opening. The hog is then carried on to the upper run of the conveyor 39 where one rear leg of the hog, while the hog is in senseless and immobile condition, will be shackled in the customary manner by a shackling chain 45. This shackling chain is in turn engaged with one of the hooks on the upwardly moving run of the conveyor 44 and the hog suspended head downward from one rear leg by the shackling chain is then elevated to a point where the transfer mechanism 45 transfers the shackling chain to one of the overhead conveyors 47. The hog suspended by the shackling chain from one of the overhead conveyors 47 is then carried to a point adjacent the sticking station A where the sticker sticks the hog with a knife 54 cutting the carotid artery of the hog while the voluntary processes of the hog are still immobilized and when the muscles of the hog are relaxed, but while the involuntary processes of the hog are still active. After the sticking operation the hog's heart continues to beat, pumping the blood out of the body and causing very thorough drainage of the blood from the body of the hog. The blood, of course, drains into the trough 50 where it is collected by the drain 51.

Due to the fact that the hog is immobilized from the time it leaves the tunnel 5 until it is stuck, a number of important advantages result. In the first place, as the hog is immobilized it is very easy to shackle one leg of the hog by the shackling chain 45 as the hog travels along the conveyor 39 and much labor is eliminated. The din and uproar attendant upon the shackling of the hog and the sticking of the hog during the ordinary slaughtering process are eliminated. As the hog is immobilized when it is stuck, it will not struggle, making it much easier for the sticker to perform the sticking operation and permitting more accuracy of the sticking of the hog. The muscles of the hog are relaxed after immobilization and when the hog is stuck and while blood is draining from its body. Hence, it becomes impossible for the hog to tighten its muscles as it is stuck or after it is stuck, and more blood will be normally drained from the hog's body than has been the case heretofore when through fright or natural reactions the hog tightens its muscles before it is stuck or while, after being stuck, blood is draining from its body. Due to the fact that the hog cannot struggle when it is stuck, the blood streams from the hog directly into the trough 50 and the body of the hog and the bodies of other hogs adjacent thereto are not splattered with blood to the same extent as when the hog is in control of its voluntary processes. All the blood of the hog is conserved for commercial use. Also, by reason of the fact the body of the hog and adjacent hogs are not splattered with blood to any appreciable extent, it becomes unnecessary to change the scalding water in the scalding vat, into which the body of the hog is later immersed, as often as would otherwise be necessary, thereby conserving on the scalding hot wash water.

If carbon dioxide is employed as the anaesthetizing gas as is primarily contemplated by me, it will produce no deleterious effect on the meat taken from the slaughtered hog, and inasmuch as the hog will be killed by sticking while the hog is still alive, there will be no violation of our present laws which require that hogs be stuck while they are still alive.

Care should be taken that the concentration of the carbon dioxide employed and the period of subjection of the hog to the action of the gas is insufficient to kill the hog. It is contemplated that the dosage will be such that if the hog after being removed from the gassing tunnel 5 is not stuck within a short period of time the hog will fully recover. Due to the fact that the intermediate portion of the tunnel 5 is at a lower level than the entrance and exit openings 5d and 5e of the tunel, there is little loss of the carbon dioxide gas through these openings in the tunnel, and the loss through these openings will be insufficient to endanger the workers at the slaughter house, and the loss is minimized by the doors 6 and 7. While carbon monoxide could be employed in place of carbon dioxide, the use of carbon monoxide tends to color the meat red, making it difficult to detect the age of the meat; which fact may be objectionable from a commercial standpoint. Also, the use of carbon monoxide is somewhat dangerous because of the toxic effect of a small concentration of the carbon monoxide, and if carbon monoxide should be used safeguards must be taken to eliminate the dangers attendant upon its use. Nitrous oxide can also be employed for the purpose.

I have found through experimentation that by using concentrated carbon dioxide in the tunnel and exposing the hog to the carbon dioxide for approximately 60 seconds, the average hog will be made senseless and immobile for a sufficient period of time to carry the hog to the sticking station, and that this period of exposure to the concentrated carbon dioxide will not kill the hog and the involuntary processes of the hog will continue until it is stuck. It normally takes from 30 to 45 seconds after the hog is expelled from the tunnel to shackle the hog, hoist it, convey it to the sticking position and stick it, and while the hog starts to recover its senses and mobility after leaving the gas tunnel, it will remain senseless and immobile until after the sticking operation takes place.

One of the chief advantages of the process is that the hogs can be moved through the tunnel and carried forwardly to the sticking position in a continuous stream so that the supply of hogs to the sticker is continuous rather than intermittent, and thus a larger number of hogs can be handled in a shorter time. Not only is a great deal of labor saved in slaughtering the animals and preparing them for slaughter, but the treatment of the animals is much more humane than with the processes heretofore employed.

It is, of course, possible to employ other means than that illustrated for bringing the hogs or other animals to a position where they enter the tunnel and for carrying the hogs or other animals to the sticking position after emergence from the tunnel. While the process is particularly beneficial for use in slaughtering hogs, it is possible that it may also be used in the slaughtering of other animals such as sheep, cattle, etc., and it is to be understood that the process is in no sense limited to use with hogs.

It will be understood that various changes may be made in the form, details, arrangements and proportions of the different parts of the apparatus and that changes may be made in the steps of the processes described without departure from the scope of the present invention, which generally stated, consists in the matter shown, and described, and set forth in the appended claims.

I claim:

1. The process of slaughtering animals which consists in moving the animals in a continuous stream through a gas chamber, subjecting them to an anaesthetizing gas in said chamber for a period sufficient to immobilize the voluntary processes of the animals without affecting the involuntary processes of the animals and sticking the animals after emerging from the gas chamber to bleed the animals while their voluntary processes are immobilized and while the involuntary processes of the animals are still active.

2. The process of slaughtering animals which consists in moving the animals in a continuous stream through a gas chamber, subjecting them to an anaesthetizing gas in said chamber for a period sufficient to immobilize the voluntary processes of the animals without affecting the involuntary processes of the animals, varying the concentration of the anaesthetizing gas to vary the period of anaesthesia of the animals and sticking the animals after emerging from the gas chamber to bleed the animals while their voluntary processes are immobilized and while the involuntary processes of the animals are still active.

3. The process of slaughtering animals which consists in moving the animals in a continuous stream through a gas chamber, subjecting them to an anaesthetizing gas in said chamber for a period sufficient to immobilize the voluntary processes of the animals without affecting the involuntary processes of the animals, varying the speed of movement of the animals through the chamber to vary the period of anaesthesia of the animals and sticking the animals after emerging from the gas chamber to bleed the animals while their voluntary processes are immobilized and while the involuntary processes of the animals are still active.

4. The process of slaughtering animals which consists in moving the animals in a continuous stream through a gas chamber, subjecting them to an anaesthetizing gas in said chamber for a period sufficient to immobilize the voluntary processes of the animals without affecting the involuntary processes of the animals, shackling the animals after emergence from the gas chamber while the voluntary processes of the animals are still immobilized, conveying the animals in a shackled condition to a sticking position while the voluntary processes of the animals are still immobilized and sticking the animals at the sticking position while the voluntary processes of the animals are still immobilized and while the involuntary processes of the animals are still active.

5. The process of slaughtering animals which consists in confining the animals to prevent them from turning while moving the animals in a continuous stream through a gas chamber, subjecting them to an anaesthetizing gas in said chamber for a period of time sufficient to immobilize the voluntary processes of the animals without affecting the involuntary processes of the animals and sticking the animals after emergence from the gas chamber to bleed the animals while the voluntary processes of the animals are immobilized, but while the involuntary processes of the animals are still active.

6. The process of slaughtering animals which consists in moving the animals in a continuous stream through a confined continuous passage having a greater depth at an intermediate portion than at its entrance and exit ends, subjecting the animals to an anaesthetizing gas heavier than air in the deeper portions of the passage for a period of time sufficient to immobilize the voluntary processes of the animals without affecting the involuntary processes of the animals, and sticking the animals after emergence from the passage to bleed the animals while the voluntary processes are immobilized and while the involuntary processes of the animals are still active.

7. The process of slaughtering animals which consists in confining the animals to prevent them from turning while moving them in a continuous stream through a confined continuous passage having a greater depth at its intermediate portion than at its entrance and exist ends, subjecting the animals to carbon dioxide gas in the deeper portions of the passage for a period of time sufficient to immobilize the voluntary processes of the animals without affecting the involuntary processes of the animals and sticking the animals after emergence from the passage to bleed the animals, while their voluntary processes are immobilized and while the involuntary processes of the animals are still active.

LAURENCE W. MURPHY.

REFERENCES CITED

The following references are of record in the file of this patent:

UNITED STATES PATENTS

| Number | Name | Date |
| --- | --- | --- |
| 2,185,949 | Regensburger | Jan. 2, 1940 |